(12) United States Patent
Geppert et al.

(10) Patent No.: US 8,417,736 B2
(45) Date of Patent: Apr. 9, 2013

(54) METHOD, SERVER EXTENSION AND DATABASE MANAGEMENT SYSTEM FOR STORING NON XML DOCUMENTS IN A XML DATABASE

(75) Inventors: Julius Geppert, Darmstadt (DE);
 Michael Gesmann, Darmstadt (DE);
 Gary Woods, Seeheim (DE)

(73) Assignee: Software AG, Darmstadt (DE)

( * ) Notice: Subject to any disclaimer, the term of this patent is extended or adjusted under 35 U.S.C. 154(b) by 280 days.

(21) Appl. No.: 12/588,552

(22) Filed: Oct. 19, 2009

(65) Prior Publication Data

US 2010/0131460 A1 May 27, 2010

(30) Foreign Application Priority Data

Nov. 21, 2008 (EP) .................................... 08020291

(51) Int. Cl.
 *G06F 17/30* (2006.01)

(52) U.S. Cl. ........ 707/803; 707/802; 707/804; 715/234; 715/236; 715/239

(58) Field of Classification Search ........................ None
 See application file for complete search history.

(56) References Cited

U.S. PATENT DOCUMENTS

| | | | |
|---|---|---|---|
| 6,549,922 B1 | 4/2003 | Srivastava et al. | |
| 2006/0101058 A1* | 5/2006 | Chidlovskii | 707/102 |
| 2008/0222517 A1* | 9/2008 | Halim et al. | 715/236 |

OTHER PUBLICATIONS

Dr. Harald SchÖning, Tamino—a DBMS Designed for XML, Proceedings 17th International Conference on Data Engineering, Apr. 2-6, 2001, pp. 149-154).*
Software AG: "Tamino-Specific Extensions to the Logical Schema", Tamino XML Schema User Guide, Version 4.4.1 (Sep. 2007).
Software AG: "Tamino WebDAV Server", Software AG's Implementation of the WebDAV Standard for the Tamino XML Database, May 2001.

* cited by examiner

*Primary Examiner* — Anteneh Girma
(74) *Attorney, Agent, or Firm* — Nixon & Vanderhye P.C.

(57) ABSTRACT

The present invention relates to a method for storing at least one non-XML document (10) in an XML database (1), the method comprising the steps of:
 a. transforming the at least one non-XML document (10) into at least one XML document (20) by one or more transformation functions, the at least one XML document (20) conforming to a schema comprising references to the one or more transformation functions; and
 b. storing the at least one XML document (20) in the XML database (1).

9 Claims, 8 Drawing Sheets

Fig. 6

Figure 1:
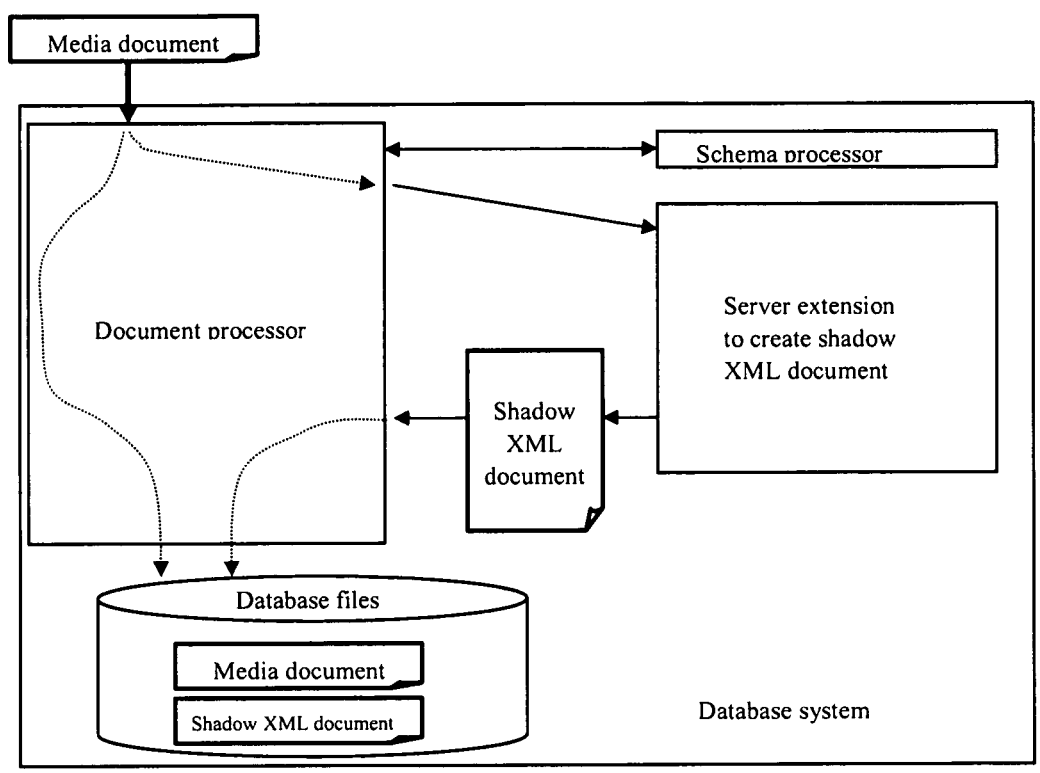

```
<xs:schema ... >
  <xs:annotation>
    <xs:appinfo>
      <tsd:schemaInfo name = "mySchema">
        <tsd:collection name = "myCollection"></tsd:collection>
        <tsd:doctype name = "myDoctype">
          <tsd:nonXML>
            <tsd:shadowXML>
              <tsd:onBinaryInsert>
                ServerExtension.putBinary
              </tsd:onBinaryInsert>
              <tsd:onTextInsert>
                ServerExtension.putText
              </tsd:onTextInsert>
              <tsd:onBinaryAccess>
                ServerExtension.getBinary
              </tsd:onBinaryAccess>
              <tsd:onTextAccess>
                ServerExtension.getText
              </tsd:onTextAccess>
            </tsd:shadowXML>
          </tsd:nonXML>
        </tsd:doctype>
      </tsd:schemaInfo>
    </xs:appinfo>
  </xs:annotation>

<xs:element name="myDoctype">
      <!-- the root element „myDoctype" generated by the
           putBinary/putText functions    -->
  </xs:element>
</xs:schema>
```

Fig. 7 content.txt
```
<?xml version="1.0" encoding="UTF-8"?>
<office:document-content
   xmlns:office="urn:oasis:names:tc:opendocument:xmlns:office:1.0"
   xmlns:text="urn:oasis:names:tc:opendocument:xmlns:text:1.0"
   office:version="1.2">
   <office:body>
      <office:text>
         <text:p text:style-name="Standard">
            This document was created for demonstration purposes.
         </text:p>
      </office:text>
   </office:body>
</office:document-content>
``` meta.txt
```
<?xml version="1.0" encoding="UTF-8"?>
<office:document-meta
   xmlns:office="urn:oasis:names:tc:opendocument:xmlns:office:1.0"
   xmlns:dc="http://purl.org/dc/elements/1.1/"
   xmlns:meta="urn:oasis:names:tc:opendocument:xmlns:meta:1.0"
   office:version="1.2">
   <office:meta>
      <meta:initial-creator>Michael Gesmann</meta:initial-creator>
      <meta:creation-date>2008-10-28T18:48:40.25</meta:creation-date>
      <meta:document-statistic
            meta:table-count="0"
            meta:image-count="0"
            meta:object-count="0"
            meta:page-count="1"
            meta:paragraph-count="1"
            meta:word-count="7"
            meta:character-count="53"/>
      <dc:date>2008-10-28T18:50:11.73</dc:date>
      <dc:creator>Michael Gesmann</dc:creator>
      <meta:editing-duration>PT00H01M36S</meta:editing-duration>
      <meta:editing-cycles>1</meta:editing-cycles>
      <meta:generator>OpenOffice.org/3.0$Win32 OpenOffice.org_project/300m9$Build-9358</meta:generator>
   </office:meta>
</office:document-meta>
``` mimetype
```
application/vnd.oasis.opendocument.text
```

META-INF/manifest.mf
```
<?xml version="1.0" encoding="UTF-8"?>
<manifest:manifest
xmlns:manifest="urn:oasis:names:tc:opendocument:xmlns:manifest:1.0">
 <manifest:file-entry manifest:media-type="application/vnd.oasis.opendocument.text"
      manifest:version="1.2"
      manifest:full-path="/"/>
 <manifest:file-entry manifest:media-type="text/xml" manifest:full-path="content.xml"/>
 <manifest:file-entry manifest:media-type="text/xml" manifest:full-path="meta.xml"/>
</manifest:manifest>
```

Fig. 8

```xml
<?xml version="1.0" encoding="UTF-8"?>
<file
    name="example.odt"
    mediatype=" application/vnd.oasis.opendocument.text">
  <content>

<file name="content.txt">
       <content>
            <office:document-content
               xmlns:office="urn:oasis:names:tc:opendocument:xmlns:office:1.0"
               xmlns:text="urn:oasis:names:tc:opendocument:xmlns:text:1.0"
               office:version="1.2">
               <office:body>
                  <office:text>
                     <text:p text:style-name="Standard">
                      This document was created for demonstration purposes.
                     </text:p>
                  </office:text>
               </office:body>
            </office:document-content>
       </content>
    </file>

<file name="meta.txt">
       <content>
            <office:document-meta
               xmlns:office="urn:oasis:names:tc:opendocument:xmlns:office:1.0"
               xmlns:dc="http://purl.org/dc/elements/1.1/"
               xmlns:meta="urn:oasis:names:tc:opendocument:xmlns:meta:1.0"
               office:version="1.2">
               <office:meta>
                  <meta:initial-creator>Michael Gesmann</meta:initial-creator>
                  <meta:creation-date>2008-10-28T18:48:40.25</meta:creation-date>
                  <meta:document-statistic
                         meta:table-count="0"
                         meta:image-count="0"
                         meta:object-count="0"
                         meta:page-count="1"
                         meta:paragraph-count="1"
                         meta:word-count="7"
                         meta:character-count="53"/>
                  <dc:date>2008-10-28T18:50:11.73</dc:date>
                  <dc:creator>Michael Gesmann</dc:creator>
                  <meta:editing-duration>PT00H01M36S</meta:editing-duration>
                  <meta:editing-cycles>1</meta:editing-cycles>
                  <meta:generator>OpenOffice.org/3.0$Win32 OpenOf-
fice.org_project/300m9$Build-9358</meta:generator>
               </office:meta>
            </office:document-meta>
       </content>
    </file>

<file name="mimetype">
       <content>
            application/vnd.oasis.opendocument.text
       </content>
    </file>

<file name="META-INF/manifest.mf">
       <content>
            <manifest:manifest
xmlns:manifest="urn:oasis:names:tc:opendocument:xmlns:manifest:1.0">
               <manifest:file-entry manifest:media-
type="application/vnd.oasis.opendocument.text"
                  manifest:version="1.2"
                  manifest:full-path="/"/>
               <manifest:file-entry manifest:media-type="text/xml" manifest:full-
path="content.xml"/>
               <manifest:file-entry manifest:media-type="text/xml" manifest:full-
path="meta.xml"/>
            </manifest:manifest>
       </content>
    </file>
</file>
```

METHOD, SERVER EXTENSION AND DATABASE MANAGEMENT SYSTEM FOR STORING NON XML DOCUMENTS IN A XML DATABASE

This application claims priority to European Patent Application No. 08020291.4 filed 21 Nov. 2008, the entire contents of each of which is hereby incorporated by reference.

1. TECHNICAL FIELD

The present invention relates to a method, a server extension and a database management system for storing non-XML documents in an XML database.

2. THE PRIOR ART

XML databases are one of the most important technical tools of modern information societies. The high degree of flexibility of such databases allows to store and to retrieve data in a highly efficient manner. Generally, XML databases are designed for XML documents. However, in the prior art it is also known to extend an XML database so that it is capable to store other types of documents. For example the XML database Tamino of applicant is adapted to store non-XML documents such as plain text files, MS Office files, PDF files, images and audio files, etc. To enable the future retrieval of such non-XML documents from the database, it is known to analyze any non-XML document to be stored and to extract metadata for generating a so-called XML shadow document corresponding to the non-XML document (see FIG. 1). Using XQuery, such shadow XML documents can later be searched and the corresponding non-XML document can be retrieved from the database (see FIG. 2).

Further similar approaches are known from the prior art. For example the U.S. Pat. No. 6,549,922 B1 discloses an extensible framework for the automatic extraction of metadata from media files. The extracted metadata may be combined with additional metadata from sources external to the media files and the combined meta-data is stored in an XML database together with the original media file.

The US 2005/0050086 A1 describes a multimedia object retrieval apparatus and method for retrieving multimedia objects from structured documents containing both a multimedia object and relevant explanation text.

Furthermore, a media system is disclosed in the US 2003/0105743 A1 which includes a store of individual files of media content and a separate repository of related meta-information, as well as a query interface to search for media files in a database.

The US 2007/0073663 A1 discloses a system and a method for providing full text searching of content within a content management system. The system comprises a repository for storing content in a plurality of nodes that have binary as well as metadata properties. The document focuses on efficient searching strategies in the repository.

In summary, the prior art approaches mainly address the task of querying non-XML documents in an XML database, i.e. they describe how to create accompanying shadow documents comprising metadata that can be searched with standard query languages. However, a co-existence of the original non-XML documents and the generated shadow documents in a database is inconvenient, since the two documents have to be kept synchronized. Furthermore, none of the prior art approaches addresses the task of efficiently modifying the contents in the XML database, which are still non-XML content.

In view of the above, it is therefore the technical problem of the present invention to provide an approach for storing non-XML documents in an XML database which allows for querying as well as updating the contents in the XML database in an efficient manner, thereby at least partly overcoming the disadvantages of the prior art.

3. SUMMARY OF THE INVENTION

In one aspect of the present invention, this problem is solved by a method for storing at least one non-XML document in an XML database. In the embodiment of claim 1, the method comprises the steps of:

a. transforming the at least one non-XML document into at least one XML document by one or more transformation functions, the at least one XML document conforming to a schema comprising references to the one or more transformation functions; and b. storing the at least one XML document in the XML database.

Accordingly, the method stores XML documents in the XML database which are the result of a transformation of the non-XML documents by one or more transformation functions, examples of which are presented in the detailed description below. The one or more transformation functions are referenced from a schema to which the XML documents conform. The transformation of the non-XML documents into "pure" XML documents is especially advantageous, since there is no need anymore to synchronize "shadow XML documents" with the original non-XML documents, which would have been both stored in the database according to the above presented prior art.

In one aspect of the invention, the at least one XML document comprises all the content of the at least one non-XML document. This is especially advantageous, since the non-XML document comprising the whole content of the original non-XML document may be searched by standard XQuery mechanisms, unlike in the prior art, where only the metadata which was extracted into the shadow XML document or an index which was generated from the non-XML document can be searched. Furthermore, the at least one non-XML document may be a structured non-XML document.

In another aspect of the invention, the one or more transformation functions may be adapted for transforming different types of the at least one non-XML document. Examples of different types of non-XML documents are binary WORD and PDF files or text files.

The method may in another aspect comprise the further step of directly updating the at least one XML document in the XML database as a response to an XQuery update. Since the non-XML documents are preferably transformed into "pure" XML documents, standard query mechanisms, e.g. XQuery, may be applied for updating their contents, which greatly improves the efficiency in the update process. This is especially advantageous over the prior art, where standard query mechanisms are not applicable directly when storing the original non-XML documents in the database, since non-XML documents cannot be efficiently modified by standard query mechanisms.

Furthermore, the method may comprise the further step of transforming the at least one XML document in the XML database into the at least one non-XML document by one or more inverse transformation functions, the schema comprising references to the one or more inverse transformation functions and the step of retrieving the at least one non-XML document from the database. Accordingly, the original non-XML document may be re-generated from the data in the XML database upon request.

Furthermore, the schema may define a root element, wherein the at least one XML document comprises the root element and further comprises at least one child element of the root element, the at least one child element comprising the transformed content of the at least one non-XML document. Additionally, the at least one child element may indicate the type of non-XML document.

Furthermore, a plurality of implementations of the transformation and/or inverse transformation functions may be referenced by the schema.

The present invention also relates to a server extension for storing at least one non-XML document in an XML database, the server extension being adapted for performing any of the described methods. Such a server extension may be part of a larger database management system (DBMS).

Finally, a computer program is provided comprising instructions adapted for performing any of the described methods.

4. SHORT DESCRIPTION OF THE DRAWINGS

Figure 2:
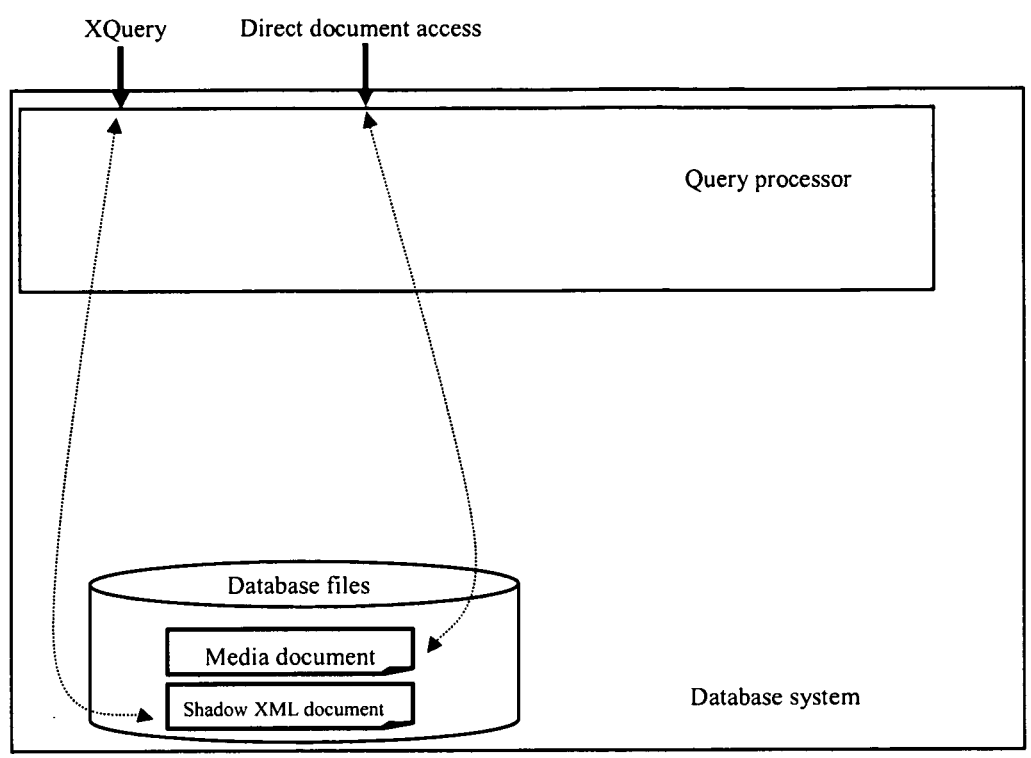
Figure 3:
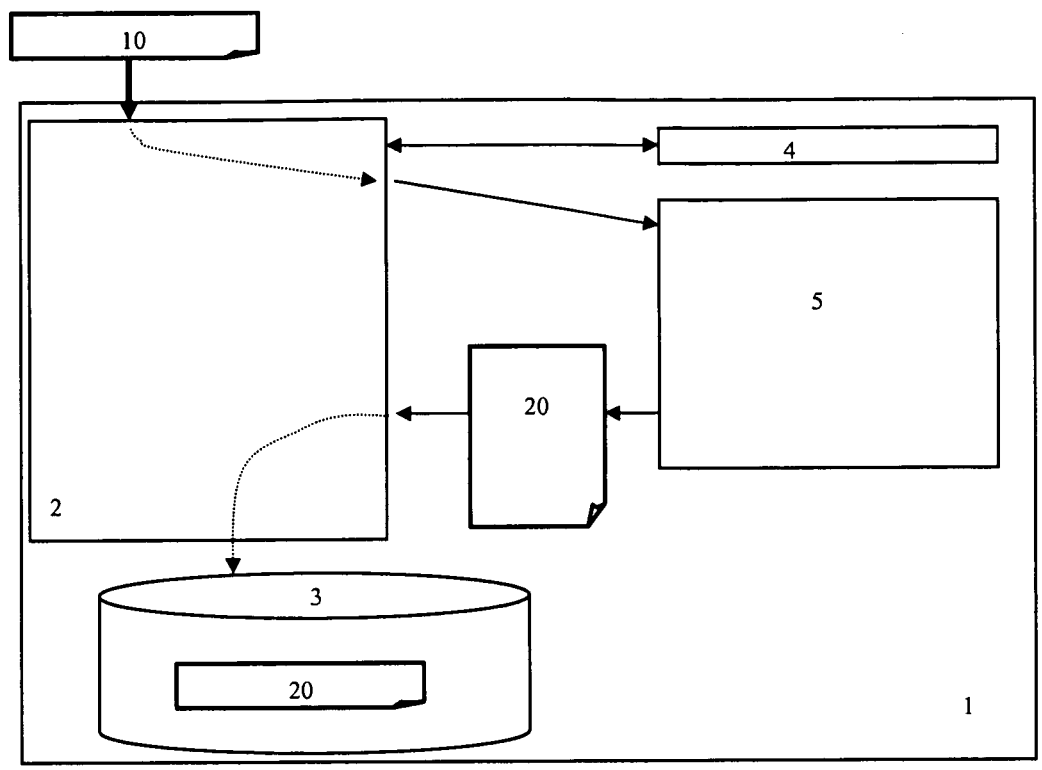
Figure 4:
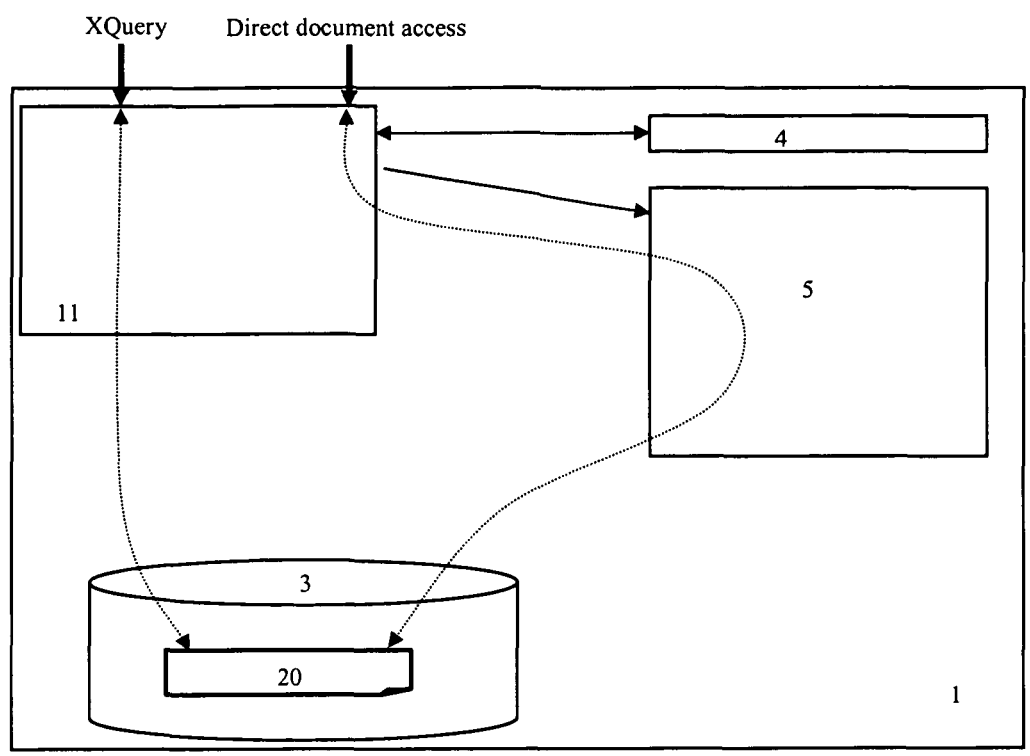
Figure 5:
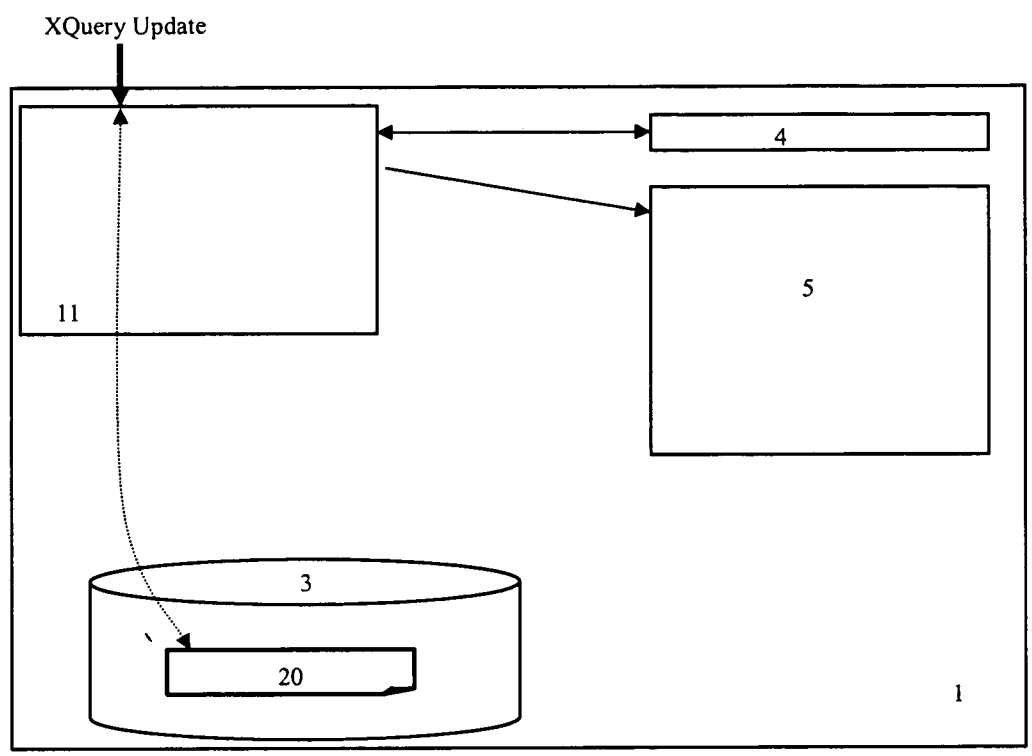

In the following detailed description, presently preferred embodiments of the invention are further described with reference to the following figures:

FIG. 1: A schematic representation of an XML database system for storing non-XML documents according to the prior art;

FIG. 2: A schematic representation of retrieving a non-XML document from an XML database system according to the prior art;

FIG. 3: A schematic representation of an XML database system according to an embodiment of the present invention;

FIG. 4: A schematic representation of retrieving a non-XML document from an XML database system according to an embodiment of the present invention;

FIG. 5: A schematic representation of updating a non-XML document in an XML database system according to an embodiment of the present invention;

FIG. 6: An exemplary schema definition of an XML-ized document according to an embodiment of the present invention;

FIG. 7: An exemplary "OpenOffice" file comprising four sub-files; and

FIG. 8: An exemplary XML document resulting from the transformed "OpenOffice" file from FIG. 7.

5. DETAILED DESCRIPTION OF PREFERRED EMBODIMENTS

In the following, exemplary embodiments of the method of the present invention are described. It will be understood that the functionality described below can be implemented in a number of alternative ways, for example on a single database system, in a distributed arrangement of a plurality of databases with an integral storage or an external storage, etc. None of these implementation details is essential for the present invention.

FIG. 3 presents an overview of an exemplary XML database system 1. The system 1 generally serves to store, to retrieve and to update non-XML documents such as the exemplary file 10 in FIG. 3. The file 10 can be any type of non-XML document and preferably comprises structured media content e.g. a text file in any kind of format (WORD, PDF), a video file, an audio file, a combination thereof, an image, an arbitrary set of binary data such as measurement results, etc.

For processing the file 10, the XML database system 1 comprises in one embodiment a document processor 2. The document processor 2 drives the process for storing a document. The file 10 is first forwarded to a schema processor 4. The operation of the schema processor 4 and the further elements of the XML database system 1 which are shown on the right side of FIG. 3 serves to process the file 10 so that it can be searched and retrieved similar to traditional XML documents. In the exemplary embodiment of FIG. 3, the schema processor 4 provides information about a server extension 5 to be called. It is to be noted that the server extension 5 could also be integrated into the standard processing engine of a database server of the overall XML database system and does not have to be provided as a separate entity. However, the provision of a separate server extension 5 facilitates the upgrading of an existing XML database system with the functionality for the handling of non-XML files, such as the file 10.

The server extension 5 processes the file 10 and transforms it into an XML document 20 by one or more transformation functions (not shown in FIG. 3), which is then stored in a storage means 3, for example a RAID array (not shown) or a similar storage device of the XML data base system 1. Any volatile or non-volatile storage means known to the person skilled in the art can be used as the storage means 3 of the XML database system 1. Depending on the type of file 10, different steps can be performed to generate the XML document 20, i.e. different transformation functions may be provided.

One example is the transformation of a WORD file 10 conforming to the "OpenOffice" format of Open Office or the "OfficeOpen" format of Microsoft. The data of such a file 10 conforming to these formats (FIG. 7 shows an exemplary "OpenOffice" file) comprises an archive (a compressed zip-file), which internally comprises a plurality of XML sub-files (FIG. 7 shows that the exemplary file 10 comprises four sub-files: content.txt, meta.txt, mimetype and META-INF/manifest.mf). The XML sub-files in this archive are structured in directories and each conforms to an XML schema. During the transformation of the WORD file 10, the archive may be decompressed and the resulting XML sub-files may be merged into one XML document 20 (as shown in FIG. 8) while maintaining the directory information of the XML sub-files. Accordingly, the generated XML document 20 comprises metadata indicating the original directory information (the metadata added to the XML document 20 during the transformation is marked in bold in FIG. 8) as well as the original contents of the sub-files of the file 10 (located inside the <content>-elements in FIG. 8). Moreover, an overall XML schema may be generated for the merged XML document 20, which references the XML schemas of the original XML sub-files.

Another example is the transformation of a PDF file 10. The internal structure of PDF files is standardized by Adobe and describes e.g. how the formatting of text, the inclusion of pictures, the structure of document sections and pages, table of contents, meta data, etc. is defined in a PDF document. A transformation of the PDF file 10 may then be performed based on this information.

Using the XML document 20 as a, preferably complete, representation of the original file 10, an efficient search can be performed using standard XQuery mechanisms, as depicted in FIG. 4. When calculating the result of an XQuery, the server extension 5 retrieves the corresponding XML document 20 from the storage means 3 and applies one or more inverse transformation functions (not shown in FIG. 4) in order to re-generate the original non-XML document 10, which is then returned as the XQuery result.

This reverse transformation may be performed inversely to the transformation described above. In the example of an XML document 20 generated from a WORD file 10, the original XML sub-files may be identified in the XML document 20 and compressed into an archive based on the directory information captured during the transformation process, which results in the original WORD document 10.

A further advantageous feature of the present invention is the fact that updating the contents of the XML database system 1 can be achieved by standard query mechanisms like XQuery updates, which may be applied directly on the XML document 20 stored in the storage means 3 (i.e. directly on the contents of the non-XML file 10) as depicted in FIG. 5. This is especially advantageous over the prior art, since the prior art databases still store non-XML documents which cannot be modified efficiently by standard query mechanisms.

One aspect of the efficiency of the XML database system of the present application is the inspection of a plurality of XML documents 20 for modifications and the updating these documents with one Query.

For example, if the XML documents 20 comprise information on their owner (according to the schema of the XML documents 20), all XML documents 20 owned by "person a" could be modified to be owned by "person b" with one single XQuery update, without the need for opening and manually editing each document.

Furthermore, all occurrences of a word "crossvision Tamino Server" could be edited to "webMethods Tamino Server" in all XML documents 20 with one single XQuery without opening and editing each individual document.

In a presently preferred embodiment, the XML document 20 conforms to a schema definition like the example in FIG. 6. The exemplary schema definition comprises special elements <tsd:onBinaryInsert> and <tsd:onTextInsert> which link to the transformation functions needed for transforming the file 10 into its corresponding XML document 20. Furthermore, the schema definition in FIG. 6 comprises the special elements <tsd:onBinaryAccess> and <tsd:onTextAccess> which link to the respective inverse transformation functions.

As the example in FIG. 6 shows, the schema may reference different transformation functions for different types of non-XML documents to be stored in and retrieved from the XML database system, e.g. putBinary( ) and getBinary( ) functions for transforming binary non-XML documents and putText( ) and getText( ) functions for transforming textual non-XML documents. It should be appreciated that a schema as shown in FIG. 6 may reference further transformation and inverse transformation functions suitable for transforming other types of documents.

Moreover, a reference to the transformation and reverse transformation functions may itself reference different implementations of the functions. For example, the putBinary( ) function may be provided in different implementations specific to the types of binary documents, e.g. one implementation specific for binary WORD files and another implementation specific for binary PDF files. It is then dynamically determined which implementation is to be used for transformation, depending on the type of non-XML document.

This is especially advantageous, since the schema definition is not affected when e.g. a new type of document is to be supported. In this case, only new transformation and inverse transformation functions have to be provided, but the schema definition does not have to be edited.

Furthermore, the schema definition depicted in FIG. 6 defines a root element called "myDocType". When a non-XML document 10 is transformed into an XML document 10, the generated XML document 10 thus comprises a <myDocType> element as its root element which serves as a wrapper. The actual contents of the non-XML document 10 are stored inside the root element, i.e. as child elements of the root element. If e.g. a PDF document 10 is transformed, the root element <myDocType> preferably comprises a child element <pdf> which stores the contents of the PDF file 10. Accordingly, if a WORD file 10 is transformed, the root element <myDocType> may comprise a child element <officeopen> for storing the contents of the WORD file 10.

The method described above may be implemented in hardware, firmware, software and combinations thereof. The processors and/or servers described herein may be hardware-implemented in certain example embodiments. Software or firmware may be executed by one or more general-purpose or specific-purpose computing devices including a processing system such as a microprocessor and a microcontroller. The software may, for example, be stored on one or more storage media (optical, magnetic, semiconductor or combinations thereof) and loaded into a RAM for execution by the processing system. The software may also be executed from a ROM. Other suitable memories may also or instead be used. The systems and methods described herein may also be implemented in part or whole by hardware such as application specific integrated circuits (ASICs), field programmable gate arrays (FPGAs), logic circuits and the like.

The invention claimed is:

1. A method for storing at least one non-XML document in an XML database, the method comprising:
   transforming the at least one non-XML document into at least one XML document by one or more transformation functions, the at least one XML document conforming to a schema comprising references to the one or more transformation functions;
   storing the at least one XML document in the XML database; and
   directly updating the at least one transformed XML document in the XML database as a response to an XQuery update, the direct update being applied on contents of the non-XML document,
   wherein the schema defines a root element and wherein the at least one XML document comprises the root element and further comprises at least one child element of the root element, the at least one child element comprising the transformed content of the at least one non-XML document, and
   wherein the at least one child element may indicate the type of the at least one non-XML document.

2. The method of claim 1, wherein the at least one XML document comprises all the content of the at least one non-XML document.

3. The method of claim 1, wherein the at least one non-XML document is a structured non-XML document.

4. The method of claim 1, wherein the one or more transformation functions are configured to transform different types of the at least one non-XML document.

5. The method of claim 1, further comprising:
   transforming the at least one XML document in the XML database into the at least one non-XML document by one or more inverse transformation functions, the schema comprising references to the one or more inverse transformation functions; and
   retrieving the at least one non-XML document from the database.

6. The method of claim 1, wherein the schema includes references to either or both of a plurality of implementations of the transformation, and inverse transformation functions are referenced by the schema.

7. A server extension for storing at least one non-XML document in an XML database, the server extension being implemented in a computer including at least one processor configured to perform the method of claim 1.

8. A database management system including at least one processor and comprising the server extension according to claim 7.

9. A non-transitory computer readable storage medium tangibly storing thereon a computer program comprising instructions that, when executed by at least one processor of a computer system, perform the method of claim 1.

* * * * *